(12) United States Patent
Lange et al.

(10) Patent No.: US 11,564,301 B2
(45) Date of Patent: Jan. 24, 2023

(54) AUTOMATED SCOTOPIC ADAPTATION SYSTEM AND USES THEREOF

(71) Applicant: Good Interfaces, Inc., New York, NY (US)

(72) Inventors: Justin Lange, Ghent, NY (US); Kevin Jiang, New York, NY (US)

(73) Assignee: Good Interfaces, Inc., New York, NY (US)

( * ) Notice: Subject to any disclaimer, the term of this patent is extended or adjusted under 35 U.S.C. 154(b) by 0 days.

(21) Appl. No.: 17/564,401

(22) Filed: Dec. 29, 2021

(65) Prior Publication Data

US 2022/0217826 A1  Jul. 7, 2022

Related U.S. Application Data

(60) Provisional application No. 63/134,043, filed on Jan. 5, 2021.

(51) Int. Cl.
*H05B 47/11* (2020.01)
*H05B 45/12* (2020.01)
*H05B 47/16* (2020.01)

(52) U.S. Cl.
CPC ............ *H05B 47/11* (2020.01); *H05B 45/12* (2020.01); *H05B 47/16* (2020.01)

(58) Field of Classification Search
CPC ........ H05B 47/10; H05B 47/11; H05B 47/16; H05B 45/10; H05B 45/12; H05B 45/30
See application file for complete search history.

(56) References Cited

U.S. PATENT DOCUMENTS 4,734,834 A   3/1988  Petzl et al.
2016/0192459 A1*  6/2016  Siminovitch ........ H05B 47/115
                                                    315/84

FOREIGN PATENT DOCUMENTS

EP   3145280 A1   3/2017

OTHER PUBLICATIONS

Ferwerda et al., A Model of Visual Adaptation for Realistic Image Synthesis, Proceedings of the 23rd Annual Conference on Computer Graphics and Interactive Techniques, Aug. 1996.
Petzl.com, Reactive Lighting, https://www.petzl.com/US/en/Sport/REACTIVE-LIGHTING, accessed Dec. 28, 2021.

* cited by examiner

*Primary Examiner* — Jimmy T Vu
(74) *Attorney, Agent, or Firm* — Ryan, Mason & Lewis, LLP (57) ABSTRACT

Methods, systems, and computer program products for automated scotopic adaptation are provided herein. A computer-implemented method includes measuring ambient illumination levels associated with at least one user over a first period of time; measuring illumination intensity levels generated by one or more illumination source devices during at least a portion of the first period of time; generating a scotopic adaptation model associated with the at least one user by processing at least a portion of the measured ambient illumination levels in conjunction with processing at least a portion of the measured illumination intensity levels; and automatically adjusting one or more illumination intensity levels generated by at least a portion of the one or more illumination source devices based at least in part on the scotopic adaptation model and one or more ambient illumination levels associated with the at least one user detected over a second period of time.

20 Claims, 4 Drawing Sheets

AUTOMATED SCOTOPIC ADAPTATION SYSTEM AND USES THEREOF

FIELD

The field relates generally to illumination technology, and more particularly to light adaptation techniques.

BACKGROUND

In visual physiology, adaptation can refer to the ability of the retina of the eye to adjust to various levels of light. Natural night vision, also referred to as scotopic vision, includes the ability to see under low-light conditions. In a typical context, for a human to transition from day vision to night vision, he or she must undergo a dark adaptation period of varying duration in which each eye adjusts from a high luminescence setting to a low luminescence setting, increasing light sensitivity, often by multiple orders of magnitude. This adaptation period is different between rod cells and cone cells, and results from the regeneration of photopigments to increase retinal sensitivity. Light adaptation, in contrast, is commonly carried out much more quickly than dark adaptation (e.g., within seconds).

A pupillary light reflex is one mechanism of light adaptation, and is responsible for adjusting the amount of light that reaches the retina (e.g., by a factor of approximately ten in many cases). Additionally, in response to varying ambient light levels, rod cells and cone cells of an eye function both in isolation and in tandem to adjust the visual system. Also, changes in the sensitivity of rod cells and cone cells in the eye are major contributors to dark adaptation.

As noted above, dark adaptation typically takes a longer time to occur and/or complete than does light adaptation (e.g., hours for dark adaptation versus seconds for light adaptation). Accordingly, even brief exposure to bright light can reset such processes. For example, turning on a conventional light source (e.g., a lamp, headlamp, flashlight, overhead light, lantern, etc.), even for a few seconds, can introduce enough bright light into a user's surroundings that the user quickly loses his or her night vision, meaning that the user would then have to spend a non-trivial amount of time (e.g., up to several hours) away from and/or out of the presence of light to regain his or her scotopic vision.

SUMMARY

Illustrative embodiments of the invention provide an automated scotopic adaptation system and methods of use thereof. An example computer-implemented method can include measuring ambient illumination levels associated with at least one user over a first given period of time, and measuring illumination intensity levels generated by one or more illumination source devices during at least a portion of the first given period of time. The method can also include generating a scotopic adaptation model associated with the at least one user by processing at least a portion of the measured ambient illumination levels in conjunction with processing at least a portion of the measured illumination intensity levels. Additionally, the method can include automatically adjusting one or more illumination intensity levels generated by at least a portion of the one or more illumination source devices based at least in part on the scotopic adaptation model and one or more ambient illumination levels associated with the at least one user detected over a second given period of time.

Illustrative embodiments can provide significant advantages relative to conventional illumination source devices and uses thereof. For example, challenges associated with causing a user to quickly lose his or her night vision when turning on an illumination source are overcome through automatically computing scotopic adaptation in connection with an illumination source device by configuring the illumination source device to monitor the ambient brightness of a user's surroundings and/or the illumination source device's surroundings, and automatically creating and implementing a model of the user's current physiological night vision adaptation.

These and other illustrative embodiments described herein include, without limitation, methods, apparatus, networks, systems and processor-readable storage media.

DETAILED DESCRIPTION

As detailed herein, one or more embodiments include an automated scotopic adaptation system and methods of use thereof.

Figure 1:
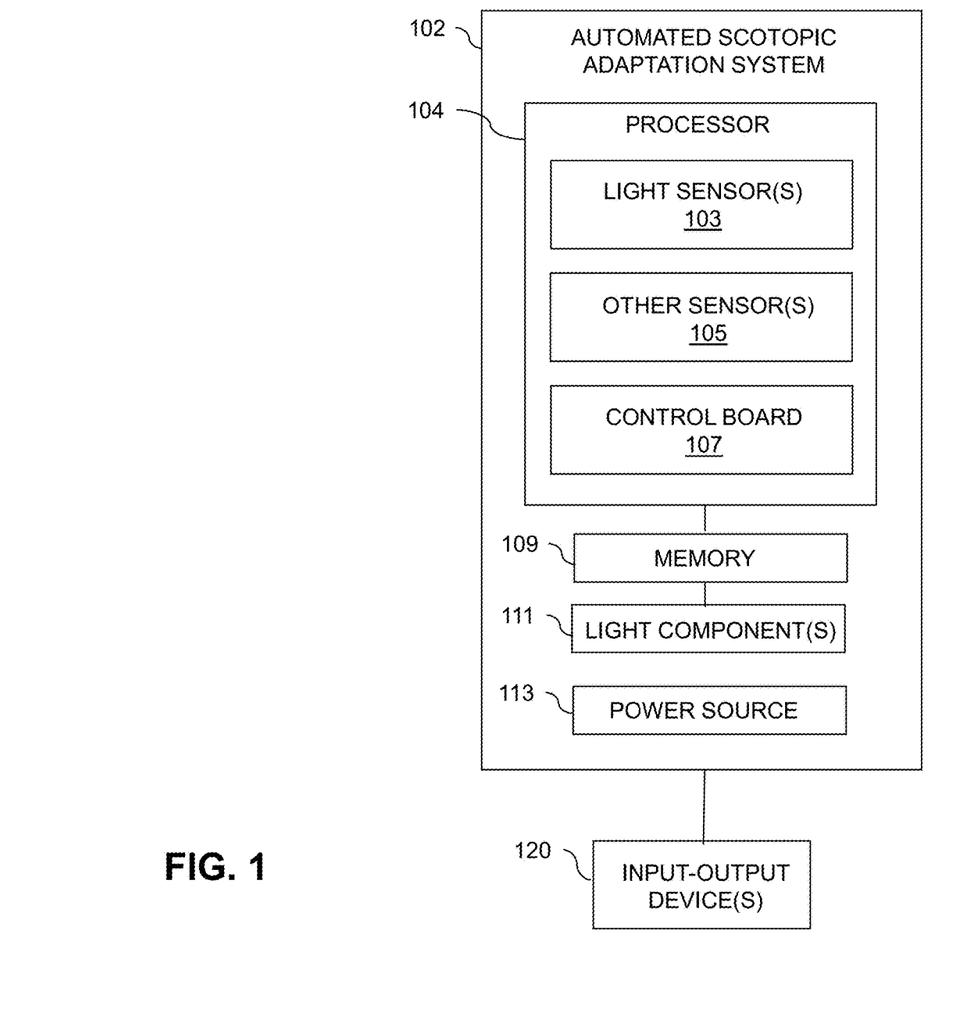
FIG. 1 is a block diagram of an automated scotopic adaptation system in an example embodiment of the invention.

FIG. 1 shows an automated scotopic adaptation system that in the FIG. 1 embodiment can be implemented using at least one processing device. Each such processing device can include at least one processor and at least one associated memory, and can implement one or more functional software modules or components for controlling certain features of the automated scotopic adaptation system.

In the example embodiment of the invention illustrated in FIG. 1, the automated scotopic adaptation system 102 includes a processor 104 coupled to a memory 109, one or more light components 111 (which can include, for example, various light-emitting diodes (LEDs)), and a power source 113 (which can include, for example, one or more batteries).

The processor 104 can include, for example, a microprocessor, a microcontroller, an application-specific integrated circuit, a field-programmable gate array or other type of processing circuitry, as well as portions or combinations of such circuitry elements.

The memory 109 can include, for example, random access memory (RAM), read-only memory (ROM) or other types of memory, in any combination. The memory 109 and other memories disclosed herein can also be viewed as examples of processor-readable storage media, which can store executable computer program code and/or other types of software programs.

Examples of such processor-readable storage media can include, by way merely of example and not limitation, a storage device such as a storage disk, a storage array or an integrated circuit containing memory, as well as a wide variety of other types of computer program products. The term "processor-readable storage media" or "computer-readable storage medium," as used herein, should be understood to exclude transitory, propagating signals.

Also, it is to be appreciated that the term "user" herein is intended to be broadly construed so as to encompass, for example, human, hardware, software or firmware entities, as well as various combinations of such entities.

Also associated with the automated scotopic adaptation system 102 are one or more input-output devices 120, which can include, by way merely of example, manually configurable buttons, knobs, dials, etc., as well as remote controls, keyboards, displays or other types of input-output devices in any combination. Such input-output devices 120 can be used to support one or more user interfaces (UIs) to the automated scotopic adaptation system 102, as well as to support communication between the automated scotopic adaptation system 102 and other related systems and devices not explicitly illustrated in FIG. 1.

Referring again to the depiction of the automated scotopic adaptation system 102 in the FIG. 1 example, the processor 104 can also include one or more light sensors 103, one or more other sensors 105, and a control board 107. Also, it is to be appreciated that FIG. 1 depicts merely one example configuration and/or embodiment, and that other embodiments can include and/or encompass other configurations. For example, in at least one embodiment, one or more of the one or more light sensors 103, one or more other sensors 105, and control board 107 can be implemented and/or configured separate from and/or outside of the processor 104, connected to the processor 104. Additionally or alternatively, in one or more other embodiments, the one or more light sensors 103, one or more other sensors 105, and/or light component(s) 111 can be implemented and/or configured on different modules, systems, etc. (so long as they have a communication link between them).

As further detailed herein, light sensor(s) 103 can be configured to measure the ambient light (as well as specific colors therein) of a given environment via taking regular and/or continuous readings. In one or more embodiments, such sensors 103 can also be configured to measure, in connection with a processor (e.g., processor 104), amounts of time that a user has been in one or more given environments. Also, it is to be appreciated that FIG. 1 and the corresponding descriptions represent merely example mechanisms for measuring and/or detecting light, and that other ways and/or mechanisms can be included and/or implemented in other embodiments.

As also further detailed herein, the other sensor(s) 105 depicted in FIG. 1 can include, in one or more embodiments, one or more infrared (IR) sensors, one or more ultrasonic sensors, one or more radar sensors (e.g., a gigahertz sensor), microwave or millimeter wave radios, and/or one or more other presence sensors. In one or more embodiments, such sensors 105 can be configured, for example, to detect the presence of a human being in its cone of receptivity.

As further detailed herein, at least one embodiment can also include and/or encompass one or more different color lenses and/or filters (e.g., optical bandpass filters) pertaining to different colors (red, green, etc.) so as to target cone cells and/or rod cells in particular.

Additionally, referring again to FIG. 1, in one or more embodiments, the control board 107 provides the logic for use in connection with the processor 104, including, for example, logic to activate and/or de-activate one or more of the light components 111 (such as LEDs) based on the measurements and/or detections of the light sensor(s) 103 and/or other sensor(s) 105. In one or more embodiments of the invention, the activations and/or deactivations of one or more of the light components 111 can encompass multiple pre-determined modes of operation for the automated scotopic adaptation system 102. In such an embodiment, a light controller can toggle the automated scotopic adaptation system 102 between the pre-determined modes of operation based at least in part on the measurements and/or detections of the light sensor(s) 103 and/or other sensor(s) 105.

It is to be appreciated that this particular arrangement of modules and illustrated in the processor of the FIG. 1 embodiment is presented by way of example only, and alternative arrangements can be used in one or more other embodiments of the invention. For example, the functionality associated with the modules and in other embodiments can be combined into a single module, or separated across a number of modules. By way of further example, multiple distinct processors can be used to implement different ones of the modules and, or portions thereof.

Also, at least portions of the light sensor(s) 103, other sensor(s) 105, and/or control board 107 can be implemented at least in part in the form of software that is stored in memory 109 and executed by processor 104.

By way of example, in one or more embodiments, the processor 104 can request data from the light sensor(s) 103 and/or other sensor(s) 105 on a periodic and/or consistent basis. The processor 104 can, for example, process at least a portion of the received data in connection with one or more user physiological night vision adaptation models and/or algorithms, and the mode of the automated scotopic adaptation system 102 can be adjusted via the control board 107 based at least in part on the processed data.

Figure 3:
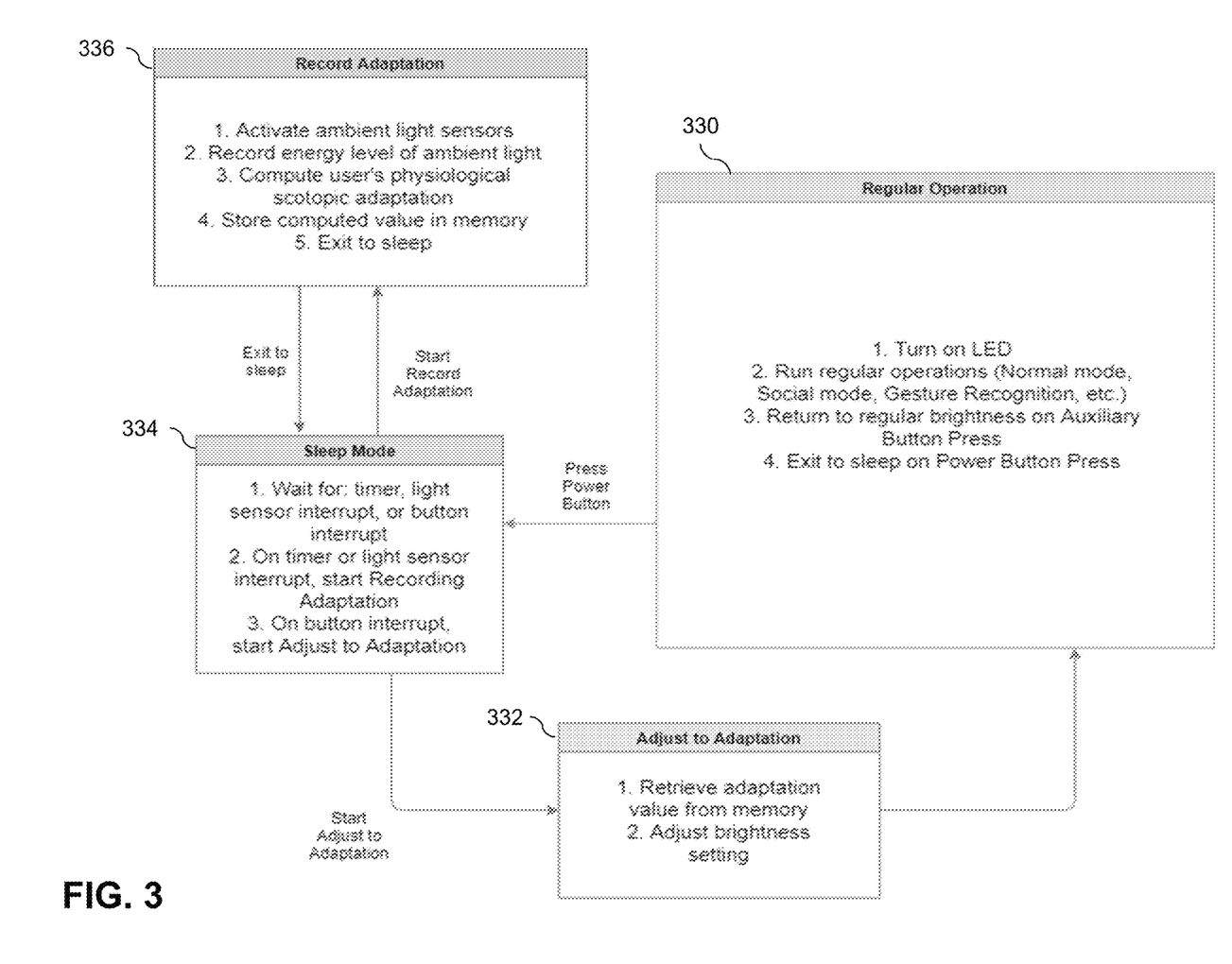
FIG. 3 is a state diagram illustrating an example embodiment of the invention.
Figure 4:
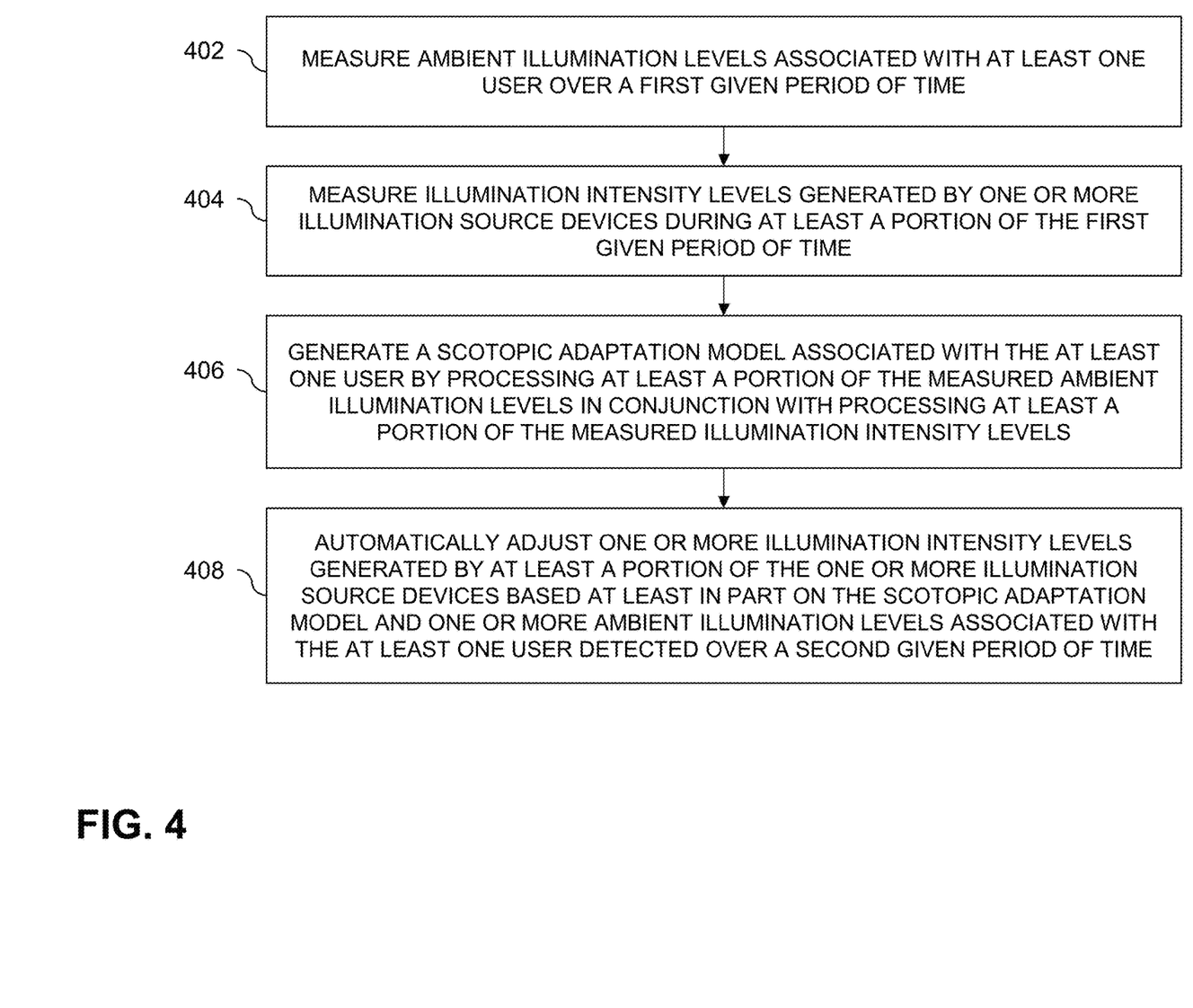
FIG. 4 is a flow diagram illustrating techniques according to an example embodiment of the invention.

Additional example processes utilizing the light sensor(s) 103, the other sensor(s) 105, and/or the control board 107 of the automated scotopic adaptation system 102 are further described herein, including in connection with the description of FIG. 3 and/or FIG. 4.

It is to be understood that the particular set of elements shown in FIG. 1 is depicted by way of illustrative example only, and in one or more other embodiments of the invention, additional or alternative elements may be used.

By way merely of illustration, consider an example embodiment including implementation within a smart home program that includes a number of sensors, and user devices (e.g., smartphones) in the nearby environment (e.g., room, floor, house, etc.). Such an embodiment can include taking regular readings of ambient light, computing human/user adaptation to light exposure, and modulating the light output of one or more lights associated with the smart home program such that the perceived (by the user) brightness is consistent.

Accordingly, as detailed herein, one or more embodiments include configuring an illumination source device to monitor the ambient brightness of a user's surroundings and/or the illumination source device's surroundings, and measure (e.g., periodically, per a given temporal schedule, etc.) light and/or brightness levels to create a model of the user's current physiological night vision adaptation. Such measurements and/or readings can be carried out even when the illumination source is off from a user's perspective; that is, periodic readings are taken and stored even when the illumination source is not emitting any light. Additionally, in at least one embodiment, such an illumination source device is able to mirror, in its internal memory, the current dark adaptation of the user.

One or more embodiments include a computer-implemented process of computing scotopic adaptation. In such an embodiment, modeling light and dark adaptation of the human eye can include, for example, determining a threshold brightness (also referred to herein as luminance) versus a background brightness (luminance) function. A computer-implemented process, as detailed in connection with one or more embodiments, includes taking the background luminance (for example, the amount of light around the user), matching the background luminance to a threshold luminance, and setting the brightness of the illumination source device according to the threshold luminance. Because the threshold luminance can be barely discernible from the background luminance, the user's dark adaptation should not be affected.

By way merely of illustration, an example function relating threshold luminance to background luminance for rod cells can include the following:

$$\log_{l_s}(L_a) = \begin{cases} -2.86 & \text{if } \log L_a \leq -3.94, \\ \log L_a - 0.395 & \text{if } \log L_a \geq -1.44, \\ (0.405 \log L_a + 1.6)^{2.18} - 2.86 & \text{otherwise} \end{cases}$$

Such an example function only uses the functions for rod cells because typical log luminance at night (e.g., moonlight and starlight) is −1 to −3, and the threshold luminance of rod cells is significantly lower than that of cone cells.

In at least one embodiment, the readings of energy taken from one or more light sensors are converted to lux (e.g., one candela/meter$^2$ (cd/m$^2$) equals one lux) to determine the background luminance. The converted energy readings are then used in a function (such as the function above, for example) to determine the threshold luminance. In one or more embodiments, this threshold luminance is then converted to an analog value for the output illumination source (e.g., an LED).

In such an embodiment, the luminance of the illumination source (e.g., LED) can be measured at different voltages to create a luminance-to-voltage function and/or look-up table.

One or more embodiments include using a look-up table in connection with monochrome values, wherein such an embodiment can include the following steps. One or more values of at least one light-measuring sensor circuit (with values encompassing, for example, voltage, a discharge of voltage over time, other measurable light-sensitive electrical property, etc.) are read and/or measured. The reading is passed through an analog-to-digital converter (ADC), and the output is stored in a variable referred to herein as totalEnergy. Subsequently, totalEnergy is converted to lux based at least in part on knowledge of how sensor readings change according to background luminance. The conversion process can also depend on one or more properties of the components used in the light-measuring sensor circuit. In one or more example embodiments, such properties can include the rate of self-discharge of capacitance on a light-measuring sensor circuit, calibration values related to the installation of the system (in a lampshade, etc.), calibration values related to the state of charge of the system, calibration values related to detected dirt, dust, moisture, debris, etc. on the sensing surface of the system and/or component related thereto. Additionally, in at least one embodiment, using a threshold luminance versus background luminance function, a threshold luminance is calculated from the converted totalEnergy. Further, using a threshold voltage and a look-up table for the given illumination source (e.g., LED), an analog value of voltage to be output to the given illumination source (e.g., LED) is assigned.

Additionally or alternatively, one or more embodiments include modeling scotopic adaptation and distance, based at least in part on an assumption that light is uniform in wavelength. In such an embodiment, additional assumptions can also include one or more of the following. For example, the threshold luminance can be lower than but approximately describes (within an order of magnitude) the minimum amount of light (e.g., in lux) that must be cast onto an object for the user to discern that object. If the automated scotopic adaptation system knows the distance between the illumination source and the primary object to be illuminated, as well as the beam dispersion, the automated scotopic adaptation system can calculate the necessary light source output (e.g., in lumens) necessary to achieve this minimal illumination necessary for human object detection. Further, another assumption can include an assumption that adaptation to dark increases over time at a rate that is known, relative to the amount of ambient light. Thus, if the automated scotopic adaptation system is constantly monitoring the ambient light (background luminance) with precision necessary to measure even small amounts of light, the automated scotopic adaptation system may determine the current dark adaptation of the user, which in turns can be used to determine the threshold luminance of that user, even before the illumination source is turned on.

As also detailed herein, one or more embodiments include determining at least one conversion factor for detection a threshold to increase light output to a given level. By way merely of example, if such a conversion factor is 1, that indicates that no conversion is carried out. In such an example embodiment, the higher the conversion threshold, the more quickly dark adaptation is lost, and the lower the conversion threshold (minimally, 1, for example) the less that the illumination source device affords any increase in visual acuity.

Additionally, at least one embodiment includes implementing a formula for determining the fall-off of light over a given distance that incorporates both the distance that the light travels from the illumination source device to the reference object, and the light that must reflect back from the reference object. Such a formula can, for instance, make assumptions about the reflectivity of the reference object. By way merely of example, in film auto exposure, 18% grey can be assumed.

Further, one or more embodiments include implementing at least one heuristic for determining what object(s) within the field of view of the illumination source device is/are considered the reference. By way merely of example, the closest object that is at least 10% of the field of view can be considered the reference. In at least one embodiment, such a heuristic can be encoded in software or determined via the restriction of the field of view of one or more distance sensors by a mechanical mask and/or analog process.

Additionally, one or more embodiments include determining at least two known dark adaptation curves: at least one at no ambient light, and at least one at low ambient light. From these dark adaptation curves, such an embodiment can include interpolating between the dark adaptation curves to enable the automated scotopic adaptation system to calculate the dark adaptation for any measured ambient light level.

Further, at least one embodiment also includes implementing a formula for determining the actual lumen output of a given illumination source (e.g., LED) without measuring the light in real-time. Such a determination can include processing, for example, voltage, heat, and/or the given power output curves of the illumination source (e.g., LED).

In connection with one or more of the aspects noted above, a formula for calculating the luminance (e.g., in lux) on the surface of an object given the quantity of light emitted by a light source (also referred to herein as luminous flux (e.g., in lumens)) and the distance of the surface from the light source can include the following: E (luminance)=ϕ (luminous flux)/distance². Knowing the target luminance, which can be similar to the threshold luminance calculated using ambient light and the distance from the object, the output luminous flux of the illumination source device can be calculated in connection with one or more embodiments.

As detailed herein, it is to be appreciated that there are dark adaptation curves for different stages of dark adaptation. In one or more embodiments, such dark adaptation curves can be stored in computer memory, for example, as a look-up table. By way merely of example, a simplified version of a dark adaptation look-up table can include the following:

| Computed Threshold Brightness (Lux) | Time (Minutes) |
| --- | --- |
| 0.1 | 1 |
| 0.001 | 5 |
| 0.0001 | 10 |
| 0.00003 | 20 |

When an automated scotopic adaptation system, in accordance with at least one embodiment, produces an ambient light reading, the reading is stored in memory with a timestamp. The ambient light is compared to a certain threshold to determine if the user's surrounding and/or the illumination source device's surrounding is "dark" (in accordance with a given definition or value threshold). If the new light value is lower or equal in intensity to the threshold, then the automated scotopic adaptation system considers the surrounding to be "dark" and starts or continues to increment the timer that keeps track of how long the user has spent in a "dark" surrounding.

If the new ambient light value increases above a certain threshold, then the automated scotopic adaptation system no longer considers the surrounding to be "dark," and the automated scotopic adaptation system consults a light adaptation look-up table. The light adaptation look-up table relates ambient light, instead of time, to threshold brightness.

Additionally, it is to be appreciated that there are luminous flux versus current curves for many illumination sources (e.g., LEDs). The current being supplied to the illumination source can be calculated from the resistance of the illumination source and the voltage being supplied to the illumination source. Given a required luminous flux, a pulse-width modulation (PWM) value for an analog write can be determined.

As further detailed herein, in one or more embodiments, an automated scotopic adaptation system can have at least modes operation including an ambient light sensing mode (e.g., when the illumination source is off), and an active light sensing and distancing sensing mode (e.g., when the illumination source is on).

Also, at least one embodiment includes determining color, mechanical, and chemical adaptation, considering one or more effects of light at different wavelengths. In such an embodiment, if the illumination source device that the user is currently using is in a somewhat or fully dark context, and the user turns on the illumination source, the output of the illumination source will be lower than even the normal lowest setting (also referred to herein as "STARLIGHT OUTPUT"). This low output will persist until the user presses causes a modification (e.g., presses at least one given button on the device), at which point the light will increase, but only somewhat (to a setting also referred to herein as "MOONLIGHT OUTPUT"). An additional modification from the user (e.g., another press of at least one button on the device) will increase the light to a normal "lowest" setting of the illumination source, and from that point on, the illumination source will function as normal without regard to the user's dark adaptation. However, in accordance with an example embodiment, once the user turns off the light, the automated scotopic adaptation process will begin again.

Additionally or alternatively, in one or more embodiments, an automated scotopic adaptation system is affixed with a number of red, green, blue, white (RGBW) illumination sources (e.g., LEDs) such that the system may adjust not only the intensity of light output but also the color output. Also, an automated scotopic adaptation system, in normal operation, can provide a high color rendering index (CRI) white beam.

As described herein, at least one embodiment includes operating in a monochrome context. Such an embodiment includes configuring an automated scotopic adaptation system with a diffuse cap and/or Fresnel lens, such as a PIR sensor used for infrared sensing or one or more professional light meters, wherein such a configuration enables the gathering of light from a variety of angles.

Such an embodiment also includes a light sensing device comprising a phototransistor and/or other light sensing component (e.g., a photodiode which produces a voltage or a measurable change in resistance or other electrical property when visible light is present). Also, such an embodiment includes analog circuitry, including a capacitor, which can, for example, be charged by voltage produced by one of the light sensing components. A microcontroller unit (MCU) wakes out of a low current sleep state on a regular schedule (such as, for example, once every five seconds), and measures the energy stored in the capacitor by switching a transistor and discharging it over a resistor. Also, in one or more embodiments, a high-resolution ADC on the MCU digitizes this value. The total energy (if any) captured by the capacitor during the measurement period can be averaged over the measurement period, and via at least one mathematical formula, converted to an estimation of light (e.g., measured in lux) that likely reached the user's eyes. These values are then stored in memory by the MCU.

Alternatively, in one or more embodiments, this process of taking measurements may be interrupt-driven rather than periodic, or can be carried out via a combination of both techniques. In an example of an interrupt-driven technique, when light enters a light-sensing component (e.g., a phototransistor), an interrupt is triggered which allows the MCU to briefly wake from sleep, record the value, and go back to sleep. To save power and prevent repeated triggering of interrupts and value storing in very bright environments (that is to say, when dark adaptation has not begun to take place), if the system determines that the user is not at all dark adapted, after any given light sensing interrupt results in a high light value being stored in memory, further interrupts are ignored by the MCU until a brief timeout period has elapsed (for example, one minute). Accordingly, one or more embodiments include leveraging the relationship between light energy and electrical energy of a light sensing component (e.g., a photodiode, a phototransistor, etc.).

As described herein, at least one embodiment includes operating in a multicolor context. As is to be appreciated, the sensitivity of the human eye to light of a certain intensity varies over the wavelength range between approximately 380 nanometers and approximately 800 nanometers. Light of certain wavelengths will have a stronger (deleterious) effect on physiological night vision adaptation than other wavelengths.

Therefore, to accurately determine the effect that light exposure has on the user's dark adaptation, at least one embodiment includes determining or approximating not only the intensity of the light but also the wavelength of the light. This can be accomplished using one or more techniques, such as, for example, putting a diffraction grating between the lens and a series of light detecting components and measuring the distance. Such techniques can also include, for example, using three or more light sensing components (photodiodes, phototransistors, etc.), wherein each light sensor is equipped with a lens that attenuates or blocks light of certain frequencies from passing through. By measuring the ratio of the signal at each of the three or more light sensors, as well as the total signal, a ratio of the RGB elements of the light may be obtained and used to accurately map the exposure of the light to its corresponding impact on the physiological dark adaptation of the user.

Accordingly, one or more embodiments, as detailed herein, include automatically implementing adaptation to seeing in low levels of light. Factors affecting dark adaptation can include intensity and duration of the pre-adapting light. By increasing the levels of pre-adapting luminance, the duration of cone mechanism dominance extends, while the rod mechanism switch over is more delayed. In addition, the absolute threshold takes longer to reach. The opposite is true for decreasing the levels of pre-adapting luminance. For at least this reason, at least one embodiment includes taking readings of the ambient light even when the illumination source is on, as the amount of bright light that the user is exposed to affects the speed of any subsequent dark adaptation.

Factors affecting dark adaptation can also include size and location on the retina. The location of a test spot affects the dark adaptation curve because of the distribution of the rod cells and the cone cells in the retina. However, in accordance with at least one embodiment, an assumption and/or approximation is made that any light that strikes its sensor is equal to the light striking the user's eyes.

Additionally, factors affecting dark adaptation can also include wavelength of the threshold light. Varying the wavelengths of stimuli also affect the dark adaptation curve. Long wavelengths, such as extreme red, create the absence of a distinct rod/cone break as the rod cells and cone cells have similar sensitivities to light of long wavelengths. Conversely, at short wavelengths, the rod/cone break is more prominent because rod cells are more sensitive than cone cells once the rod cells have dark adapted. For this reason, at least one embodiment includes using RGB elements (and/or a dedicated RGB light that is appropriately lensed) to create a discontinuous lighting spectrum that favors the wavelengths of light least likely to impair dark adaptation. In other words, the light output from an illumination source device, in accordance with one or more embodiments, is different (more green or more blue, for example) depending on the current dark adaptation of the user.

Factors affecting dark adaptation can also include rhodopsin regeneration. Upon exposure to light, photopigments in both rod and cone photoreceptor cells undergo a structural change. During light adaptation, the photopigments are decomposed, thereby reducing retinal sensitivity in low luminescence settings. This is known as photoreceptor bleaching and is proportional to the quantum catch of the pigment. The regeneration of the photopigments occurs during dark adaptation, albeit at markedly different rates. Rod cells are much slower to adapt to the dark than are cone cells. The photopigment found in rod cells is called rhodopsin, and upon the absorption of light, rod cells becomes bleached, causing rhodopsin to lose all of its color and become transparent. During dark adaptation, the rod cells regenerate and the rhodopsin regains its purple pigmentation, rendering the rod cells capable of capturing light. Additionally, it is to be appreciated that a certain percentage (e.g., approximately 8%) of the population experiences some kind of color variant vision, and a calibration procedure exists wherein the individual is asked to rank brightness offerings and/or values, and such information can be utilized in accordance with one or more embodiments (e.g., in a given user's scotopic profile).

Accordingly, at least one embodiment includes modeling an overall dark adaptation based on the color-specific regeneration of rhodopsin, creating an internal real-time model of the perceived color-sensitivity of the given user. Also, one or more embodiments can take advantage of differing sensitivity of rods and cones to different wavelengths of light in a variety of ways. For example, such an embodiment can include allowing and/or enabling the induction of mesopic vision while showing color, or maintaining the perceived uniformity of a color gauge beyond the point of mesopic vision when scotopic vision is reached. By way merely of example, by reducing illumination to a given cone threshold, at least one embodiment can include induce mesopic vision. In such a mode and/or state, it is assumed that the rods of the user(s) exhibit reasonable sensitivity at the same time that the cones also exhibit reasonable sensitivity. In an example embodiment, at least one internal model (such as noted above) within the system can incorporate an understanding that rods are more sensitive to short wavelengths of light than are cones. In such an embodiment, the system can adjust displayed frequencies/colors on a gauge in certain circumstances to continue to maintain important hierarchies of information if certain displayed colors are important (e.g., a warning light). In another example embodiment, within a context of scotopic vision with a multi-color gauge, blue light can be limited so as to appear consistent to the user with red gauge elements. Based on such a model as detailed above, for example, in one or more embodiments, the output displayed by the system could increase or decrease the brightness of certain colors to maintain maximum dark adaptation of the user and/or readability of any gauges, components, etc. (e.g., by adjusting the distribution of different color wavelengths).

By way merely of illustration and/or example, one or more embodiments can be incorporated and/or implemented in and/or in connection with residential devices such as lamps, climate control panels, smoke detectors, ceiling lights, car lights, headlamps, etc., as well as commercial and/or industrial devices such as tractors, earth movers, complex lighting systems/networks, etc. Additionally or alternatively, one or more embodiments can include an implementation wherein two or more systems are networked (e.g., flood lights of an industrial tractor and control panel gauges and/or cockpit lights of the tractor), and the networked systems adjust to each other and/or to other environmental light sources (i.e., scotopic adaptation of the user with respect to the gauges).

Figure 2:
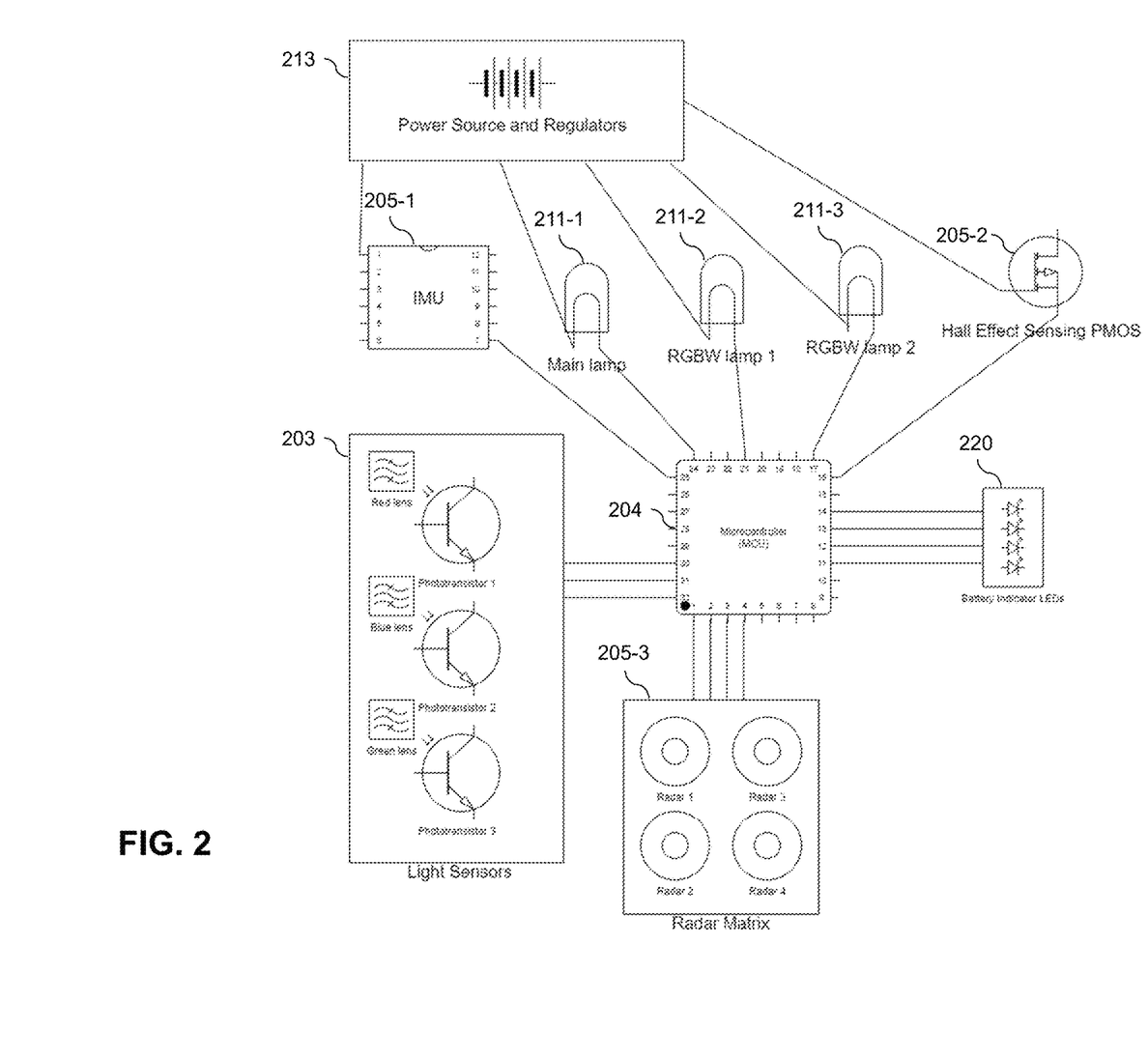
FIG. 2 is a circuit diagram illustrating an example embodiment of the invention.

FIG. 2 is a circuit diagram illustrating an example embodiment of the invention. More specifically, FIG. 2 depicts example hardware particular to at least one computer-implemented process of computing scotopic adaptation, wherein such hardware includes one or more light sensors 203 and at least one radar matrix 205-3.

Light sensors 203 can include electronic components that have light-sensitive electronic properties, such as phototransistors. Different colored lenses (e.g., a red lens, a blue lens, a green lens, etc.) can be added and/or incorporated to differentiate between different wavelengths of light. Light sensors 203 may be directly connected to a MCU 204 to allow for direct reading of the light-sensitive electronic property, such as, for example, voltage. Additionally or alternatively, there can be other components (such as capacitors, for example) between the light sensors 203 and the MCU 204 to allow for reading of, for instance, the energy stored in a capacitor over a period of time. Moreover, the light-sensitive properties of the light sensors 203 enable the estimation of the brightness of the surrounding light.

As also depicted in FIG. 2, a radar matrix 205-3, comprising multiple radar components, serves as distance sensors in one or more embodiments, while other distance sensors (e.g., such as lidar sensors, sonar sensors, etc.) can also be used and/or incorporated. Also, it is to be appreciated that a matrix is one example technique of calculating the area that an object takes up in a user's field of view. Other techniques can include using distance sensors facing multiple directions, and/or using at least one rotating distance sensor.

FIG. 2 also depicts one or more battery indicator LEDs 220, an inertial measurement unit (IMU) 205-1, a main lamp 211-1, RGBW lamps 211-2 and 221-3, a hall effect sensing P-type metal-oxide-semiconductor logic (PMOS) 205-2, and a power source and one or more regulators 213. One or more of such hardware components shown in the FIG. 2 circuit diagram can also be used in and are detailed in connection with a smart headlamp system such as described, for example, in U.S. Pat. No. 10,728,971, incorporated by reference herein.

FIG. 3 is a state diagram illustrating an example embodiment of the invention. As depicted in FIG. 3, one or more embodiments include a sleep mode 334, a record adaptation state 336, a regular operations state 330, and an adjust to adaptation state 332. In a sleep mode 334, a timer or an interrupt signal from light sensors wakes up the MCU at fixed intervals, and a state machine moves to record adaptation state 336. In record adaptation state 336, light sensors (e.g., ambient light sensors) are activated, and the brightness of surrounding light is recorded and read by the MCU. The MCU computes the dark adaptation of the given user, as a threshold brightness value, using a computed implemented process such as detailed herein in connection with one or more embodiments. Dark adaptation is stored as a value inside the memory of MCU, and the MCU then goes back to sleep (i.e., exits to sleep mode 334).

Additionally, FIG. 3 depicts waking up (that is, when the device is turned on). On an interrupt signal from the power button, the MCU leaves sleep mode 334 and initiates adjust to adaptation state 332 by reading the dark adaptation value from memory. Also, distance sensors are used to give readings on the distance of any objects directly in front of the illumination source device. Using the formula of luminance versus distance detailed herein in connection with one or more embodiments, along with the dark adaptation value and the distance, the output brightness of the main lamp is calculated and set to a certain value. One or more other formulas relating distance to luminance may also be used, and one or more additional formulas concerning the amount of light reflected from the objects in front of the headlamp may also be used for calculations of ideal brightness in connection with regular operations state 330. In regular operations state 330, the main lamp is turned on with the calculated output brightness, and regular operation of the illumination source device (e.g., normal mode, social mode, gesture recognition, etc.) is resumed and/or initiated. Upon indication from the user (e.g., the pressing of another auxiliary button), the brightness of the main lamp is returned to regular brightness. Also, in at least one embodiment, upon pressing (e.g., by the user) of a power button, the device can exit regular operations state 330 and enter sleep mode 334.

Additionally or alternatively, one or more embodiments include using a distance sensor to enable the automated scotopic adaptation system to automatically and proportionally dim and/or attenuate its outputted light if the user's hand(s) (or another object) is close by and/or within a given proximity of the system.

FIG. 4 is a flow diagram illustrating techniques according to an embodiment of the present invention. Step 402 includes measuring ambient illumination levels associated with at least one user over a first given period of time. In at least one embodiment, measuring the ambient illumination levels associated with the at least one user includes measuring periodically in accordance with a given temporal schedule. Additionally or alternatively, measuring the ambient illumination levels associated with the at least one user can include measuring using one or more light sensors, and converting the measured ambient illumination levels to units of lux.

Step 404 includes measuring illumination intensity levels generated by one or more illumination source devices during at least a portion of the first given period of time. In at least one embodiment, measuring the illumination intensity levels comprises processing one or more of voltage, heat, and at least one power output curve associated with the one or more illumination source devices. In such an embodiment, processing voltage associated with the one or more illumination source devices includes measuring illumination intensity generated by at least a portion of the one or more illumination source devices at multiple different voltages, and creating, based at least in part on the measuring of illumination intensity generated by at least a portion of the one or more illumination source devices at multiple different voltages, at least one of an illumination intensity-to-voltage function and an illumination intensity-voltage look-up table.

Step 406 includes generating a scotopic adaptation model associated with the at least one user by processing at least a portion of the measured ambient illumination levels in conjunction with processing at least a portion of the measured illumination intensity levels. In one or more embodiments, generating the scotopic adaptation model includes determining at least one threshold level of illumination generated by at least a portion of the one or more illumination source devices at multiple different voltages in connection with one or more ambient illumination levels associated with the at least one user. Such an embodiment can also include converting the at least one threshold level of illumination to at least one analog value for at least one of the one or more illumination source devices.

Additionally, in one or more embodiments, generating the scotopic adaptation model is further based at least in part on wavelength of illumination. In such an embodiment, generating the scotopic adaptation model based at least in part of wavelength of illumination includes using at least one diffraction grating between at least one lens of the one or more illumination source devices and one or more illumination detection components of the one or more illumination source devices. Additionally or alternatively, in such an embodiment, generating the scotopic adaptation model based at least in part of wavelength of illumination can include using at least one frequency attenuation lens in conjunction with one or more illumination detection components of the one or more illumination source devices.

Step 408 includes automatically adjusting one or more illumination intensity levels generated by at least a portion of the one or more illumination source devices based at least in part on the scotopic adaptation model and one or more ambient illumination levels associated with the at least one user detected over a second given period of time. In at least one embodiment, automatically adjusting one or more illumination intensity levels generated by at least a portion of the one or more illumination source devices includes determining if the one or more illumination source devices are present in an environment constituting at least a given level of darkness by comparing the one or more ambient illumination levels associated with the at least one user detected over the second given period of time to at least one threshold level of illumination associated with the one or more illumination source devices. Such an embodiment can also include incrementing a timer associated with the one or more illumination source devices, which measures an amount of time that the one or more illumination source devices are present in an environment of constituting at least a given level of darkness upon a determination that the one or more ambient illumination levels associated with the at least one user detected over the second given period of time are less than the at least one threshold level of illumination associated with the one or more illumination source devices. Additionally or alternatively, such an embodiment can also include processing an illumination adaptation look-up table, which relates ambient illumination levels to the at least one threshold level of illumination associated with the one or more illumination source devices upon a determination that the one or more ambient illumination levels associated with the at least one user detected over the second given period of time are more than the at least one threshold level of illumination associated with the one or more illumination source devices.

In one or more embodiments, the techniques depicted in FIG. 4 can additionally include implementing at least one heuristic for determining which of one or more objects within a field of view of at least one of the one or more illumination source devices are to be considered a reference object. Such an embodiment can also include determining a decrease of illumination over a given distance based at least in part on a distance that illumination travels from the at least one illumination source device to the reference object, and a level of illumination that reflects back to the at least one illumination source device from the reference object.

Also, it is to be appreciated that "model," as used herein, refers to an electronic digitally stored set of executable instructions and data values, associated with one another, which are capable of receiving and responding to a programmatic communication or other digital call, invocation, or request for resolution based upon specified input values, to yield one or more output values that can serve as the basis of computer-implemented predictions, recommendations, output data values, machine control, etc. It is also to be appreciated models can be expressed using mathematical equations and/or one or more abstract concepts, and models such as detailed herein can have a practical application in a computer in the form of stored executable instructions and data that implement the model using the computer.

Additionally, it is understood that implementation of the techniques recited herein are not limited to a particular computing environment, and one or more embodiments are capable of being implemented in conjunction with any type of computing environment (e.g., a cloud computing environment). By way of example, the techniques depicted in FIG. 4 can be implemented using one or more computer program products that can include computer useable program code stored in a computer readable storage medium in a processing device and/or server, and wherein the computer useable program code can be downloaded over a network from a remote data processing system.

Other techniques can be used in association with one or more embodiments of the invention. Accordingly, the particular processing operations and other functionality described in conjunction with the figures herein are presented by way of illustrative example only, and should not be construed as limiting the scope of the invention in any way. For example, the ordering of the process steps may be varied in one or more other embodiments of the invention, or certain steps may be performed concurrently with one another rather than serially.

The above-described example embodiments of the invention provide significant advantages relative to conventional illumination source devices and uses thereof. For example, one or more embodiments of the invention can include automatically computing scotopic adaptation in connection with an illumination source device by configuring the illumination source device to monitor the ambient brightness of a user's surroundings and/or the illumination source device's surroundings, and automatically creating and implementing a model of the user's current physiological night vision adaptation.

It is to be appreciated that the foregoing advantages are illustrative of advantages provided in certain embodiments, and need not be present in other embodiments.

Also, the terminology used herein is for the purpose of describing embodiments and is not intended to be limiting of the invention. As used herein, the singular forms "a," "an" and "the" are intended to include the plural forms as well, unless the context clearly indicates otherwise. It is further to be understood that the terms "comprises" and/or "comprising," when used herein, specify the presence of stated features, steps, operations, elements, and/or components, but do not preclude the presence or addition of another feature, step, operation, element, component, and/or group thereof.

It should again be emphasized that the embodiments of the invention described herein are presented for purposes of illustration only. Many variations may be made in the particular arrangements shown. Moreover, the assumptions made herein in the context of describing one or more illustrative embodiments of the invention should not be construed as limitations or requirements of the invention, and need not apply in one or more other embodiments of the invention. Numerous other alternative embodiments within the scope of the appended claims will be readily apparent to those skilled in the art.

What is claimed is:

1. A computer-implemented method comprising:
measuring ambient illumination levels associated with at least one user over a first given period of time;
measuring illumination intensity levels generated by one or more illumination source devices during at least a portion of the first given period of time;
generating a scotopic adaptation model associated with the at least one user by processing at least a portion of the measured ambient illumination levels in conjunction with processing at least a portion of the measured illumination intensity levels; and
automatically adjusting one or more illumination intensity levels generated by at least a portion of the one or more illumination source devices based at least in part on the scotopic adaptation model and one or more ambient illumination levels associated with the at least one user detected over a second given period of time;
wherein the method is carried out by at least one computing device.

2. The computer-implemented method of claim 1, wherein measuring the ambient illumination levels associated with the at least one user comprises measuring periodically in accordance with a given temporal schedule.

3. The computer-implemented method of claim 1, wherein measuring the ambient illumination levels associated with the at least one user comprises measuring using one or more light sensors, and converting the measured ambient illumination levels to units of lux.

4. The computer-implemented method of claim 1, wherein measuring the illumination intensity levels comprises processing one or more of voltage, heat, and at least one power output curve associated with the one or more illumination source devices.

5. The computer-implemented method of claim 4, wherein processing voltage associated with the one or more illumination source devices comprises:
measuring illumination intensity generated by at least a portion of the one or more illumination source devices at multiple different voltages; and
creating, based at least in part on the measuring of illumination intensity generated by at least a portion of the one or more illumination source devices at multiple different voltages, at least one of an illumination intensity-to-voltage function and an illumination intensity-voltage look-up table.

6. The computer-implemented method of claim 1, wherein generating the scotopic adaptation model comprises determining at least one threshold level of illumination generated by at least a portion of the one or more illumination source devices at multiple different voltages in connection with one or more ambient illumination levels associated with the at least one user.

7. The computer-implemented method of claim 6, further comprising:
converting the at least one threshold level of illumination to at least one analog value for at least one of the one or more illumination source devices.

8. The computer-implemented method of claim 1, wherein automatically adjusting one or more illumination intensity levels generated by at least a portion of the one or more illumination source devices comprises determining if the one or more illumination source devices are present in an environment constituting at least a given level of darkness by comparing the one or more ambient illumination levels associated with the at least one user detected over the second given period of time to at least one threshold level of illumination associated with the one or more illumination source devices.

9. The computer-implemented method of claim 8, further comprising:
incrementing a timer associated with the one or more illumination source devices, which measures an amount of time that the one or more illumination source devices are present in an environment of constituting at least a given level of darkness upon a determination that the one or more ambient illumination levels associated with the at least one user detected over the second given period of time are less than the at least one threshold level of illumination associated with the one or more illumination source devices.

10. The computer-implemented method of claim 8, further comprising:
processing an illumination adaptation look-up table, which relates ambient illumination levels to the at least one threshold level of illumination associated with the one or more illumination source devices upon a determination that the one or more ambient illumination levels associated with the at least one user detected over the second given period of time are more than the at least one threshold level of illumination associated with the one or more illumination source devices.

11. The computer-implemented method of claim 1, further comprising:
implementing at least one heuristic for determining which of one or more objects within a field of view of at least one of the one or more illumination source devices are to be considered a reference object.

12. The computer-implemented method of claim 11, further comprising:
determining a decrease of illumination over a given distance based at least in part on a distance that illumination travels from the at least one illumination source device to the reference object, and a level of illumination that reflects back to the at least one illumination source device from the reference object.

13. The computer-implemented method of claim 1, wherein generating the scotopic adaptation model is further based at least in part on wavelength of illumination.

14. The computer-implemented method of claim 13, wherein generating the scotopic adaptation model based at least in part of wavelength of illumination comprises using at least one diffraction grating between at least one lens of the one or more illumination source devices and one or more illumination detection components of the one or more illumination source devices.

15. The computer-implemented method of claim 13, wherein generating the scotopic adaptation model based at least in part of wavelength of illumination comprises using at least one frequency attenuation lens in conjunction with one or more illumination detection components of the one or more illumination source devices.

16. A computer program product comprising a computer readable storage medium having program instructions embodied therewith, the program instructions executable by a computing device to cause the computing device to:
measure ambient illumination levels associated with at least one user over a first given period of time;
measure illumination intensity levels generated by one or more illumination source devices during at least a portion of the first given period of time;
generate a scotopic adaptation model associated with the at least one user by processing at least a portion of the measured ambient illumination levels in conjunction with processing at least a portion of the measured illumination intensity levels; and
automatically adjust one or more illumination intensity levels generated by at least a portion of the one or more illumination source devices based at least in part on the scotopic adaptation model and one or more ambient illumination levels associated with the at least one user detected over a second given period of time.

17. A system comprising:
a memory configured to store program instructions; and
a processor operatively coupled to the memory to execute the program instructions to:
measure ambient illumination levels associated with at least one user over a first given period of time;

measure illumination intensity levels generated by one or more illumination source devices during at least a portion of the first given period of time;

generate a scotopic adaptation model associated with the at least one user by processing at least a portion of the measured ambient illumination levels in conjunction with processing at least a portion of the measured illumination intensity levels; and automatically adjust one or more illumination intensity levels generated by at least a portion of the one or more illumination source devices based at least in part on the scotopic adaptation model and one or more ambient illumination levels associated with the at least one user detected over a second given period of time.

18. The system of claim 17, wherein automatically adjusting one or more illumination intensity levels generated by at least a portion of the one or more illumination source devices comprises determining if the one or more illumination source devices are present in an environment constituting at least a given level of darkness by comparing the one or more ambient illumination levels associated with the at least one user detected over the second given period of time to at least one threshold level of illumination associated with the one or more illumination source devices.

19. The system of claim 18, wherein the processor is operatively coupled to the memory to further execute the program instructions to:

increment a timer associated with the one or more illumination source devices, which measures an amount of time that the one or more illumination source devices are present in an environment of constituting at least a given level of darkness upon a determination that the one or more ambient illumination levels associated with the at least one user detected over the second given period of time are less than the at least one threshold level of illumination associated with the one or more illumination source devices.

20. The system of claim 18, wherein the processor is operatively coupled to the memory to further execute the program instructions to:

process an illumination adaptation look-up table, which relates ambient illumination levels to the at least one threshold level of illumination associated with the one or more illumination source devices upon a determination that the one or more ambient illumination levels associated with the at least one user detected over the second given period of time are more than the at least one threshold level of illumination associated with the one or more illumination source devices.

* * * * *